Jan. 4, 1938. J. STOCKER 2,104,312
CLUTCH MECHANISM FOR AUTOMOTIVE VEHICLES
Filed Sept. 3, 1935
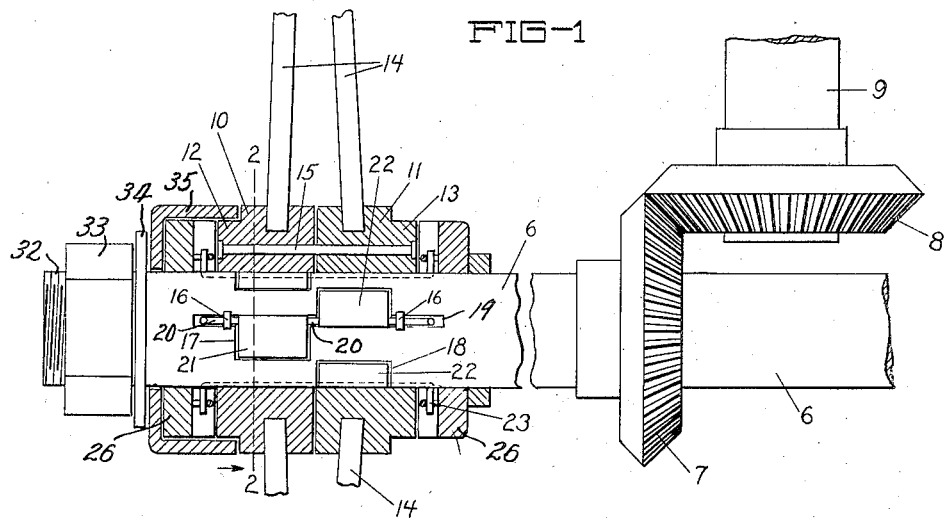
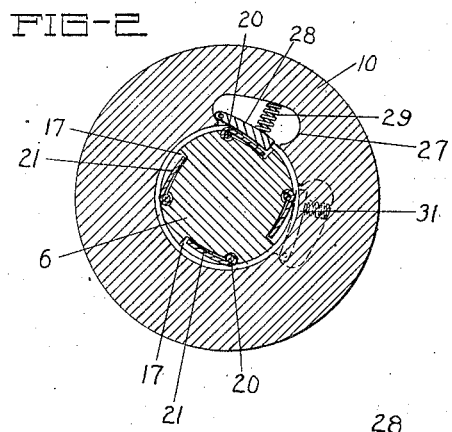
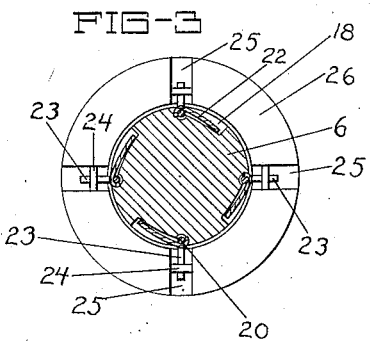
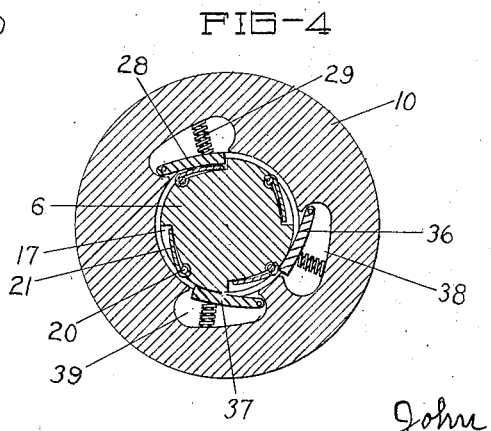
INVENTOR.
John Stocker,
BY Walter N. Haskell,
his ATTORNEY.

Patented Jan. 4, 1938

2,104,312

UNITED STATES PATENT OFFICE 2,104,312

CLUTCH MECHANISM FOR AUTOMOTIVE VEHICLES

John Stocker, Muscatine, Iowa

Application September 3, 1935, Serial No. 38,917

1 Claim. (Cl. 192—43)

My invention has reference to a clutch mechanism for automotive vehicles, and has for its purpose to provide a more simple and durable mechanism than differentials now in use in such devices, and one in which a single solid axle can be used, in place of the split or two-piece axle which is in common use. This is accomplished by means of a special form of hub, containing clutch elements which are fully effective at all times in the straight-ahead movement of a vehicle, but are ineffective and out of engagement when there is a tendency of a wheel to move faster than the axle upon which it is mounted. A large amount of the gearing which is now to be found in a differential housing, and other disadvantages of a two-piece axle can also be eliminated. Adaptations of the invention can be made so that the same may be put in operation with either the front or rear axle, or both thereof.

The above named, and other features and advantages of the invention will more fully appear from the following specification, reference being had to the accompanying drawing, in which the invention is shown in its preferred embodiment, with the understanding that changes can be made in the form and arrangement thereof, without departing from the purpose and scope of the invention.

In the drawing:—

Fig. 1 shows the invention, partly in section, as the same appears when applied to one end of an axle.

Fig. 2 is a cross-section on the broken line 2—2 of Fig. 1.

Fig. 3 is a detached sectional view of the axle 6, looking at the inner face of the collar 26, at the inner end of the hub.

Fig. 4 is a view similar to Fig. 2, showing a modified form of the invention.

The reference number 6 indicates a fragmentary shaft, shortened by a break therein, on which is fixed near a point midway its ends a bevel-gear wheel 7, in mesh with a similar wheel 8 on the end of a shaft 9, also broken away. The shaft 6 represents the rear axle of a motor vehicle, to which movement may be communicated through the shaft 9 from the motive power, to give constant rotation to the shaft 6. Near one end of the shaft 6 is a hub formed of two similar portions 10 and 11, having reduced extensions 12 and 13, and from the body portions of which spokes 14 extend outwardly for connection with the rim of a wheel.

The hub is formed of two parts as a matter of convenience in manufacture, said parts being united so as to rotate together, as by rods shown at 15.

That part of the axle 6 which is enclosed by the hub is provided with series of recesses 17 and 18, of a ratchet type, and with the teeth or detents oppositely disposed. The recesses are also in staggered position, and are united by small channels 19, in which are rockingly held rods 20 by means of keepers 16, to which rods are secured series of plates 21 and 22, of an arcuate form, corresponding to the curve of the axle 6. The relative arrangement of the plates of the two series is such that when the plates of one series are in depressed positions, in the bottoms of the recesses, the plates of the other series will be turned outwardly, in a position to complete the cylindrical form of the axle.

The ends of the rods 20 are turned outwardly, as at 23, which ends are held loosely in keepers 24 set in radial recesses 25 in the inner faces of a pair of collars 26, loosely mounted on the axle 6, at opposite ends of the hub. By a variation in speed of one or other of said collars with relation to the axle, as hereinafter explained, the rods 20 are simultaneously rocked for the purpose of shifting the positions of the sets of plates 21 and 22. As illustrated in the drawing, each set or series consists of four plates, with a corresponding number of rods 20, but this number can be increased or diminished as desired.

In the inner side of the section 10 of the hub is a cavity 27, in which is pivoted a dog 28, held normally in engagement with one of the detents 17 by means of a coiled spring 29, between said dog and the inner wall of the cavity. With the axle 6 being rotated in an anti-clockwise direction, the engagement of the dog with one of the detents, as shown in Fig. 2, will cause the hub and wheel thereon to rotate in the same direction. When the axle is moving forwardly and the movement thereof is reversed, the rods 20 will be automatically rocked by engagement of the keepers 24 and ends 23 of the rods, and variation in speed of the axle and collar containing the keeper, causing an outward movement, or spreading of the plates 21, closing the recesses 17, and permitting the hub to rotate freely on the axle. Similarly, on the reversal of the movement of the axle from a rearward to a forward one, the rods 20 are rocked in the opposite direction, moving the plates 22 outwardly, and permitting the hub to move freely in the other direction. When a turn is made in one direction or the other no such action takes place, as the hub is free to move ahead of the axle drive.

The inner side of the hub section 11 is provided with a similar cavity containing a dog 31, shown in broken lines, for engagement with the recesses 18, said dog being oppositely disposed to the dog 28, and operating similarly thereto on a reverse movement of the axle. Upon such reverse movement the plates 21 are moved outwardly, completing the cylinder beneath the section 10, permitting the hub to rotate freely. If the vehicle is moving straight to the rear the dog 31 engages with one of the detents 18, with a rearward movement of the wheel. In going round a curve rearwardly with the hub on the outside of the curve, the recesses 18 are closed by the plates 22, and the hub moves freely on the shaft again. One of the collars 26 is sufficient to give the rocking movement to the rods 20, but by positioning one of said collars at each end of the hub a more balanced effect is secured.

It will be understood that a similar hub structure is provided at the other end of the axle, with an identical operation, under similar conditions.

The end of the axle is shown threaded at 32, to receive a nut 33, in rear of which is a washer 34, holding in place on the axle a cap 35, partially enclosing the outer end of the hub.

In Fig. 4 is shown a multiple arrangement of dogs, including the original dog 28, and auxiliary dogs 36 and 37, in cavities 38 and 39 in the hub section 10. Said auxiliary dogs are spaced angularly and at unequal distances from each other so that there will be an instant re-engagement of one thereof with one of the detents 17, preventing any "back-lash" of the wheels such as might occur where a single dog would have to travel some distance before re-engaging.

What I claim, and desire to secure, is:—

In a clutch mechanism for automobiles, an axle provided at its end with two series of recesses in staggered relation forming oppositely disposed detents, a hub enclosing said recesses provided in its inner face with a pair of dogs for engagement with said series of recesses, plates in said recesses adapted for outward movement to close the same, rods rockingly supported on said axle and connecting said plates in pairs, so as to move one thereof outwardly and the other one inwardly, and vice versa, and a collar loosely mounted on said axle and operatively connected with said rods, to automatically operate the same upon a relative rotation of said collar and the axle.

JOHN STOCKER.